United States Patent
Linck

(10) Patent No.: US 9,915,304 B2
(45) Date of Patent: Mar. 13, 2018

(54) MATERIALS FOR DAMPED HEATSINK DISK BRAKE ASSEMBLY

(71) Applicant: GOODRICH CORPORATION, Charlotte, NC (US)

(72) Inventor: John Linck, Pueblo, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 41 days.

(21) Appl. No.: 14/980,354

(22) Filed: Dec. 28, 2015

(65) Prior Publication Data

US 2017/0184162 A1   Jun. 29, 2017

(51) Int. Cl.
| | |
|---|---|
| F16D 65/12 | (2006.01) |
| F16D 65/00 | (2006.01) |
| F16D 55/36 | (2006.01) |
| F16D 55/40 | (2006.01) |
| F16D 55/00 | (2006.01) |
| F16D 65/02 | (2006.01) |

(52) U.S. Cl.
CPC ......... *F16D 65/0006* (2013.01); *F16D 55/36* (2013.01); *F16D 55/40* (2013.01); *F16D 65/12* (2013.01); *F16D 65/126* (2013.01); *F16D 2055/0058* (2013.01); *F16D 2065/132* (2013.01)

(58) Field of Classification Search
CPC ...... F16D 65/0006; F16D 65/12; F16D 55/36; F16D 2200/0034; F16D 2200/0052; F16D 69/023
See application file for complete search history.

(56) References Cited

U.S. PATENT DOCUMENTS

| | | | | |
|---|---|---|---|---|
| 3,761,231 A | * | 9/1973 | Dowell et al. | F16D 65/122 192/107 M |
| 4,291,794 A | * | 9/1981 | Bauer | F16D 69/023 192/107 M |
| 4,585,096 A | * | 4/1986 | Bok | F16D 13/648 188/71.5 |
| 5,143,184 A | * | 9/1992 | Snyder | F16D 13/64 188/218 A |
| 5,255,761 A | * | 10/1993 | Zaremsky | B60T 1/065 188/18 A |
| 5,788,035 A | * | 8/1998 | Avers | F16D 13/648 192/107 C |
| 6,042,935 A | * | 3/2000 | Krenkel | C04B 35/573 156/329 |
| 6,465,110 B1 | | 10/2002 | Boss et al. | |

(Continued)

FOREIGN PATENT DOCUMENTS

| | | |
|---|---|---|
| EP | 1691101 | 8/2006 |
| EP | 2818749 | 12/2014 |

OTHER PUBLICATIONS

Product Data Sheet: CFOAM Carbon Foams, TouchStone Research Laboratory, Ltd., pp. 1-2.

(Continued)

*Primary Examiner* — Vishal R Sahni
(74) *Attorney, Agent, or Firm* — Snell & Wilmer L.L.P.

(57) ABSTRACT

A friction disk brake system may comprise a plurality of rotor friction disks and a plurality of stator friction disks. At least one of the friction disks may be a split disk friction disk. The split disk friction disk may comprise a first disk half and a second disk half. A carbon foam damping feature may be located between the first disk half and the second disk half.

16 Claims, 2 Drawing Sheets

(56) References Cited

U.S. PATENT DOCUMENTS

| | | | |
|---|---|---|---|
| 7,234,387 B2 | 6/2007 | Braun et al. | |
| 7,975,750 B2 | 7/2011 | Dessouki, et al. | |
| 9,482,299 B1* | 11/2016 | Kirkpatrick | F16D 65/12 |
| 2009/0035598 A1 | 2/2009 | Suh | |
| 2015/0001008 A1* | 1/2015 | Kirkpatrick | B64C 25/42 |
| | | | 188/71.5 |
| 2015/0129369 A1* | 5/2015 | Kirkpatrick | F16D 65/12 |
| | | | 188/71.5 |

OTHER PUBLICATIONS

Mercuri, R.A. et al., "Carbon Foam—Its Preparation and Properties", Union Carbide Corporation, pp. 1-6.
Wang, Can et al., "Damping characteristics of CVI-densified carbon-carbon composites", pp. 1821-1824, 2000, Elsevier Science Ltd.
Duocel Carbon Foam, ERG Materials and Aerospace Corporation.
Material Properties, Koppers Knows Carbon, pp. 1-2.
Extended European Search Report dated May 26, 2017 in European Application No. 16205556.0.

* cited by examiner

MATERIALS FOR DAMPED HEATSINK DISK BRAKE ASSEMBLY

FIELD

The disclosure relates generally to aircraft brake systems, and more particularly to materials for use in aircraft brake systems.

BACKGROUND

Aircraft brake assemblies encounter large amounts of torque during use. The aircraft brake assemblies for large aircraft may exhibit vibrations during use, potentially making the brake assembly less effective and potentially causing structural damage during operation. Carbon friction disks used in brake systems tend to have high compressive strength. However, the carbon friction disks may be poor at damping vibrations.

SUMMARY

A disk brake system may comprise a pressure plate; a reaction plate; and a plurality of friction disks located between the pressure plate and the reaction plate, wherein a first friction disk in the plurality of friction disks comprises a first disk half, a second disk half, and a carbon foam damping feature axially between the first disk half and the second disk half.

In various embodiments, the first friction disk may comprise a stator. The first friction disk may comprise a rotor. A porosity of the carbon foam damping feature may be between 60-85%. Each friction disk in the plurality of friction disks may comprise a carbon foam damping feature. The carbon foam damping feature may be densified using chemical vapor infiltration or other means to increase the strength, reduce porosity, and tailor damping characteristics to meet application requirements. The first friction disk may be located in a middle position of the disk brake system. A density of the carbon foam damping feature may be less than a density of the first disk half and the second disk half.

A disk brake system may comprise a pressure plate; a stator friction disk having a stator density, located axially between the pressure plate and an end plate; a rotor friction disk having a rotor density, located axially between the pressure plate and the end plate, wherein the rotor friction disk and the stator friction disk are annular disks, and the rotor friction disk and the stator friction disk are adjacent to one another and disposed coaxially, wherein at least one of the rotor friction disk and the stator friction disk is a split friction disk comprising a split friction disk first half and a split friction disk second half; and a damping feature located axially between the split friction disk first half and the split friction disk second half, wherein the damping feature comprises carbon foam having a damping feature density.

In various embodiments, the damping feature density may be less than the rotor density and is less than the stator density. The damping feature may comprise a porosity of between 60-85%. The carbon foam may be densified using chemical vapor infiltration or other means. The split friction disk first half and the split friction disk second half may each comprise an annular-shaped disk half further comprising: a friction surface; and a non-friction surface on a side opposite of the friction surface. The brake system may comprise a plurality of the rotor friction disk and a plurality of the stator friction disk, wherein the locations of the stator friction disks alternate axially with locations of the rotor friction disks, and there is one more of the rotor friction disk than there are of the stator friction disks. The split friction disk may be located in a middle position of the disk brake system. A plurality of the split friction disks may be positioned adjacent to at least one of the pressure plate and the end plate. The system may further comprise a plurality of the rotor friction disk and a plurality of the stator friction disk, wherein at least some of the plurality of the rotor friction disk and the plurality of the stator friction disk are solid friction disks positioned adjacent to at least one of the pressure plate or the end plate.

A friction disk for an aircraft brake system may comprise a first friction disk half; a second friction disk half; and a carbon foam damping feature located axially between the first friction disk half and the second friction disk half.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show exemplary embodiments by way of illustration, and not of limitation. While these various embodiments are described in sufficient detail to enable those skilled in the art to practice the subject matter of the disclosure, it should be understood that other embodiments may be realized and that logical, chemical, and mechanical changes may be made without departing from the spirit and scope of the disclosure. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
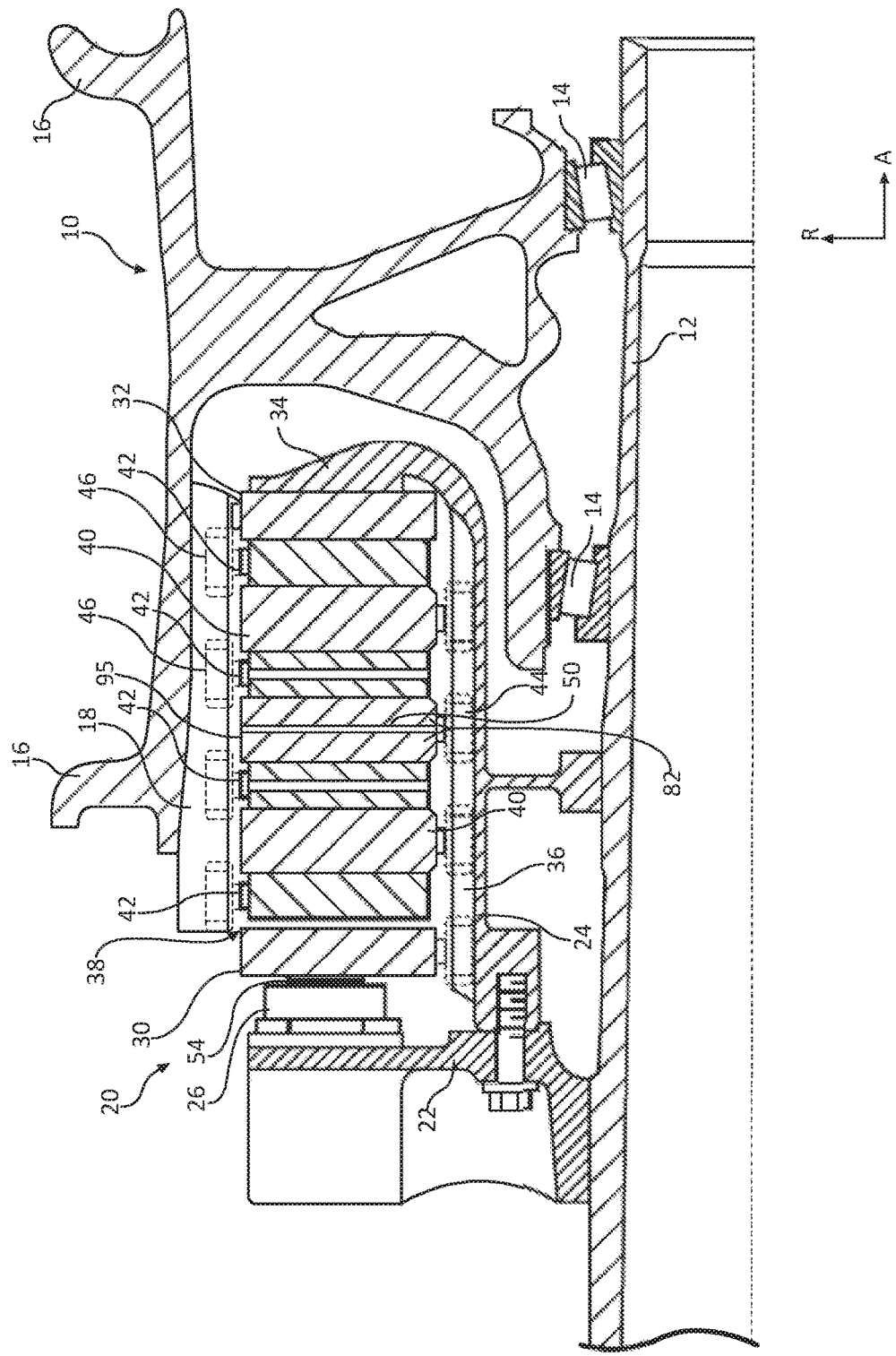
FIG. 1 illustrates a multi-disk brake system, in accordance with various embodiments.

An aircraft brake system, such as disk brake system 20 in FIG. 1, may be used to slow an aircraft while the aircraft is on the ground, for example, during landing. A disk brake system may comprise a combination of split friction disk assemblies and/or solid disk assemblies. These split friction disk assemblies and/or solid disk assemblies may be arranged together in any suitable pattern or position. According to various embodiments, the brake systems described herein employ carbon composite disks that tend to suffer less vibration and tend to generate less brake noise than conventional carbon composite disks brake systems. The split friction disks may comprise a carbon foam damping feature between halves of a split disk.

Referring to FIG. 1, a disk brake system 20 is illustrated according to various embodiments. In various embodiments, the disk brake system 20 may be used to reduce the speed of a wheel of an aircraft. An A-R axis has been included in the drawings to illustrate the axial (A) and radial (R) directions. The system may include a wheel 10 supported for rotation around an axle 12 by bearings 14. The wheel 10 includes rims 16 for supporting a tire, and a series of axially extending rotor splines 18 (one shown). Rotation of the wheel 10 is modulated by the disk brake system 20. The disk brake system 20 includes a torque flange 22, a torque tube 24, a plurality of pistons 26 (one shown), a pressure plate 30, and an end plate 32. In various embodiments, the pressure plate 30 and the end plate 32 are annular disks. The torque tube 24 is an elongated annular structure that includes a reaction plate 34 and a series of axially extending stator splines 36 (one shown). The reaction plate 34 and stator splines 36 may be integral with the torque tube 24 as shown in FIG. 1, or attached as separate components.

In accordance with various embodiments, the disk brake system 20 also includes a plurality of friction disks 38. The plurality of friction disks 38 includes at least one non-rotatable friction disk, also known as a stator friction disk 40, and at least one rotatable friction disk, also known as a rotor friction disk 42. Each of the plurality of friction disks 38 includes an attachment structure. As shown in FIG. 1, each of the stator friction disks 40 includes a plurality of stator lugs 44 at circumferentially spaced positions around the stator friction disk 40 as an attachment structure. Similarly, each of the rotor friction disks 42 includes a plurality of rotor lugs 46 at circumferentially spaced positions around the rotor friction disk 42 as an attachment structure. In various embodiments, and as shown in FIG. 1, the pressure plate 30, end plate 32, and friction disks 38 are all annular disks.

The torque flange 22 is mounted to the axle 12. The torque tube 24 is bolted to the torque flange 22 such that the reaction plate 34 is near an axial center of the wheel 10. The end plate 32 is connected to a surface of the reaction plate 34 facing axially away from the axial center of the wheel 10. Thus, the end plate 32 is non-rotatable by virtue of its connection to the torque tube 24. The stator splines 36 support the pressure plate 30 so that the pressure plate 30 is also non-rotatable. The stator splines 36 also support the stator friction disks 40. The stator friction disks 40 engage the stator splines 36 with gaps formed between the stator lugs 44. Similarly, the rotor friction disks 42 engage the rotor splines 18 with gaps formed between the rotor lugs 46. Thus, the rotor friction disks 42 are rotatable by virtue of their engagement with the rotor splines 18 of the wheel 10.

As shown in FIG. 1, the rotor friction disks 42 are arranged with the end plate 32 on one end, the pressure plate 30 on the other end, and the stator friction disks 40 interleaved so that the rotor friction disks 42 are adjacent to non-rotatable friction components. In various embodiments, the number of rotor friction disks 42 and stator friction disks 40 may vary according to the brake assembly design. The pistons 26 are connected to the torque flange 22 at circumferentially spaced positions around the torque flange 22. The pistons 26 face axially toward the wheel 10 and include pucks 54 that contact a side of the pressure plate 30 opposite the rotor friction disks 42. The pistons 26 may be powered electrically, hydraulically or pneumatically.

In various embodiments, with further reference to FIG. 1, the pressure plate 30 may be adjacent to a rotor friction disk 42. A stator friction disk 40 may be adjacent to the rotor friction disk 42, and the stator friction disk 40 and the rotor friction disk 42 may be positioned axially between the pressure plate 30 and an end plate 32. In various embodiments, the plurality of friction disks 38 may be made up of a plurality of stator friction disks 40 and a plurality of rotor friction disks 42, wherein the locations of the stator friction disks 40 alternate axially with the locations of the rotor friction disks 42 between the pressure plate 30 and the end plate 32. There may be one more rotor friction disk 42 than stator friction disks 40 in the plurality of friction disks 38. The disk brake systems contemplated herein may have any number of rotor friction disks 42 and/or stator friction disks 40, such as 5,4; 4,3; and 3,2, respectively. Conversely, there may be one more stator friction disk 40 than rotor friction disks 42 in the plurality of friction disks 38, or the number of stator friction disks 40 and rotor friction disks 42 may be equal.

In various embodiments, at least one of the friction disks 38 is a split friction disk. The at least one split friction disk may be a rotor split friction disk or a stator split friction disk. As illustrated in FIG. 1, a stator split friction disk 95 may comprise friction disk halves 82 separated by a damping feature 50. The damping feature 50 may comprise a carbon foam material which is less dense than the carbon material of the friction disk halves 82. In various embodiments, at least one of the plurality of friction disks 38 may be a rotor solid friction disk or a stator solid friction disk.

In various embodiments, a split friction disk may be positioned anywhere within the plurality of friction disks 38. In various embodiments, the stator split friction disk 95 may be positioned in a middle position of the plurality of friction disks 38. The middle position, as used herein, may refer to the position on either side of which there is an equal number of friction disks 38.

Figures 2A, 2B:
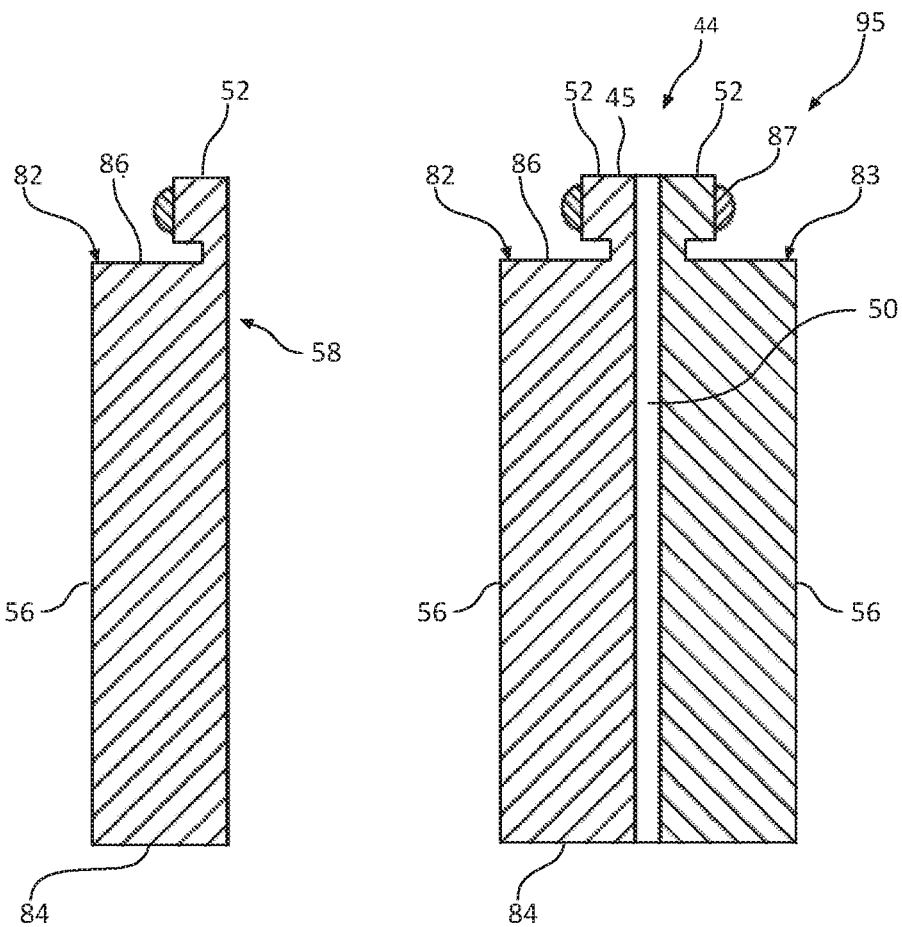
FIGS. 2A and 2B illustrate cross-sectional views of a split friction disk half and disk assembly in accordance with various embodiments.

Referring to FIGS. 2A and 2B, an embodiment of a stator split friction disk 95 is depicted. FIG. 2A shows a cross-sectional view of a split friction disk first half 82. FIG. 2B shows a cross-sectional view of a stator split friction disk 95. Considering FIGS. 2A and 2B together, the stator split friction disk 95 includes two disk halves: a split friction disk first half 82 and a split friction disk second half 83. Each disk half 82 and 83 includes an attachment structure in the form of lug half 45, a friction surface 56, and a non-friction surface 58. The friction surface 56 may be at an axial end of the disk halves 82 and 83. The friction surface 56 may be configured for operationally engaging a corresponding friction surface of another disk brake system component, such as a rotor friction disk 42. The non-friction surface 58 may be located at an axial end of the disk halves 82 and 83, such as on a side opposite of the friction surface 56.

The disk halves 82 and 83 further include an inner diameter surface 84 and a first outer diameter surface 86. The inner diameter surface 84 may be located at a radially inward facing edge of the disk halves 82 and 83. The first outer diameter surface 86 may be located at a radially outward facing edge of the disk halves 82 and 83. The friction surface 56 extends radially between the inner diameter surface 84 and a second outer diameter surface 52. The non-friction surface 58 extends radially between the inner diameter surface 84 and the first outer diameter surface 86. The non-friction surface 58 may be parallel to the friction surface 56.

Each disk half 82 and 83 may include an attachment structure in the form of a lug half 45. The lug half 45 may project radially outward from the first outer diameter surface 86. The disk halves 82 and 83 may be secured to each other by a fastening device. Importantly, while the corresponding non-friction surfaces 58 of the two disk halves 82 and 83 are held in contact with a damping feature 50 between them, they do not form a continuous structure. That is, in various embodiments the corresponding non-friction surfaces 58 are not bonded to each other, in any way, but are held together by the fastening device. However, in some embodiments, the corresponding non-friction surfaces 58 may be bonded together.

In various embodiments, with reference to FIG. 2B, there may be a damping feature 50 positioned between the non-friction surfaces 58 of the disk halves 82 and 83. The damping feature 50 may be comprised of a less dense material than the material from which the stator friction disks 40 are comprised. The damping feature 50 may comprise a carbon foam. Carbon foams are made by several manufacturers, such as CFOAM® manufactured by Touchstone Research Laboratory. Ltd., and Duocel® Carbon Foam manufactured by ERG Aerospace Corporation. Carbon foam comprises a lightweight, porous carbon structure. Carbon foam may comprise a porosity of 60-85%. The carbon foam may be machined into a disk shape to be used as the damping feature 50. In various embodiments, a chemical vapor infiltration or other densification process may be used to increase the density of the carbon foam. The densification process may increase the compressive strength of the carbon foam. The carbon foam may comprise a compressive strength of between 350 psi-600 psi (2.4 MPa-4.1 MPa), or between 75 psi-2000 psi (0.5 MPa-14 MPa).

In various embodiments, the damping feature 50 may have a damping feature density of 0.3-0.4 grams per cubic centimeter (2.5-3.3 pounds per gallon), or a density of 0.05-1.0 grams per cubic centimeter (0.4-8.3 pounds per gallon). The friction disks 38, including stator friction disks having a stator density and the rotor friction disks having a rotor density, may have a density of 1.7 grams per cubic centimeter (17 pounds per gallon). With the damping feature 50 having a lower density, the damping feature 50 absorbs energy caused by vibrations occurring between the friction disks 38 of the disk brake system, resulting in a damping effect. The damping feature 50 may be held in place between the disk halves 82 and 83 by a rivet 87 which goes through the lug halves 45 of the disk halves 82 and 83. Although the embodiment of FIGS. 2A and 2B is described in terms of stator split friction disk 95, it is understood that the same description and features apply generally to either stator split friction disks 95 or rotor split friction disks, and if applied to rotor split friction disks, the difference would be that lug 44 at first outer diameter surface 86 is replaced by a lug at the inner diameter surface 84.

Referring back to FIG. 1, in various embodiments all rotor friction disks 42 may be split friction disks, and/or all stator friction disks 40 may be split friction disks, and split friction disks may be present in the same disk brake system in any number or configuration. In various embodiments, all disks in a disk brake system may split friction disks. Vibration may be a location-dependent phenomenon within a disk brake system, so locating split friction disks in suitable positions in a disk brake system may provide a vibration damping effect. Thus, the location of split friction disks "tunes" the damping characteristics of a disk brake system based on their locations.

As used herein, the phrases "make contact with", "touch", "coupled with", "interface with" and "engage" may be used interchangeably. Different cross-hatching is used throughout the figures to denote different parts but not necessarily to denote the same or different materials.

Systems and methods are provided. In the detailed description herein, references to "various embodiments". "one embodiment", "an embodiment". "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A disk brake system, comprising:
   a pressure plate;
   a stator friction disk having a stator density of at least 1.7 grams per cubic centimeter, located axially between the pressure plate and an end plate;
   a rotor friction disk having a rotor density of at least 1.7 grams per cubic centimeter, located axially between the pressure plate and the end plate, wherein the rotor friction disk and the stator friction disk are annular disks, and the rotor friction disk and the stator friction disk are adjacent to one another and disposed coaxially, wherein at least one of the rotor friction disk and the stator friction disk is a split friction disk comprising a split friction disk first half and a split friction disk second half, wherein each half has an attachment structure that comprises a lug half; and
   a damping feature located axially between the split friction disk first half and the split friction disk second half, wherein the damping feature comprises carbon foam having a damping feature density of less than 0.4 grams per cubic centimeter and a porosity of between 60% and 69%, wherein the damping feature and the halves are connected by a rivet that goes through the lug half of the first disk, through the damping feature, and through the lug half of the second disk.

2. The disk brake system of claim 1, wherein the carbon foam is a densified carbon foam.

3. The disk brake system of claim 1, wherein the split friction disk first half and the split friction disk second half each comprise an annular-shaped disk half further comprising:
   a friction surface; and
   a non-friction surface on a side opposite of the friction surface.

4. The disk brake system of claim 1, further comprising a plurality of the rotor friction disk and a plurality of the stator friction disk, wherein locations of the stator friction disks alternate axially with locations of the rotor friction disks, and there is one more of the rotor friction disk than there are of the stator friction disks.

5. The disk brake system of claim 1, wherein the split friction disk is located in a middle position of the disk brake system.

6. The disk brake system of claim 1, wherein a plurality of the split friction disks are positioned adjacent to at least one of the pressure plate and the end plate.

7. The disk brake system of claim 1, further comprising a plurality of the rotor friction disk and a plurality of the stator friction disk, wherein at least some of the plurality of the rotor friction disk and the plurality of the stator friction disk are solid friction disks positioned adjacent to at least one of the pressure plate or the end plate.

8. The disk brake system of claim 1, wherein the damping feature comprises a compressive strength between 2.4 megapascals and 4.1 megapascals and a density of between grams per cubic centimeter 0.05 and 1.0 grams per cubic centimeter.

9. A friction disk for an aircraft brake system comprising:
   a first friction disk half having a density of at least 1.7 grams per cubic centimeter;
   a second friction disk half having a density of at least 1.7 grams per cubic centimeter; and
   a carbon foam damping feature having a density of less than 0.4 grams per cubic centimeter, a porosity of between 60% and 69% and located axially between the first friction disk half and the second friction disk half.

10. The friction disk of claim 9, wherein the carbon foam damping feature is a densified carbon foam.

11. A disk brake system, comprising:
    a pressure plate;
    a reaction plate; and
    a plurality of friction disks located between the pressure plate and the reaction plate,
    wherein a first friction disk in the plurality of friction disks comprises a first disk half having a density of at least 1.7 grams per cubic centimeter; a second disk half having a density of at least 1.7 grams per cubic centimeter, wherein the first disk half and the second disk half each have an attachment structure that comprises a lug half; and a carbon foam damping feature having a density of less than 0.4 grams per cubic centimeter and a porosity of between 60% and 69%, located axially between the first disk half and the second disk half, wherein the damping feature and the halves are connected by a rivet that goes through the lug half of the first disk half, through the damping feature, and through the lug half of the second disk half.

12. The disk brake system of claim 11, wherein the first friction disk comprises a stator.

13. The disk brake system of claim 11, wherein the first friction disk comprises a rotor.

14. The disk brake system of claim 11, wherein each friction disk in the plurality of friction disks comprises a carbon foam damping feature.

15. The disk brake system of claim 11, wherein the carbon foam damping feature is a densified carbon foam.

16. The disk brake system of claim 11, wherein the first friction disk is located in a middle position of the disk brake system.

* * * * *